(12) United States Patent
Mills

(10) Patent No.: US 9,232,139 B2
(45) Date of Patent: Jan. 5, 2016

(54) IMAGE STABILIZATION USING STRIPED OUTPUT TRANSFORMATION UNIT

(75) Inventor: Christopher L. Mills, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 381 days.

(21) Appl. No.: 13/557,109

(22) Filed: Jul. 24, 2012

(65) Prior Publication Data

US 2014/0028876 A1    Jan. 30, 2014

(51) Int. Cl.
*H04N 5/232* (2006.01)
*H04N 5/77* (2006.01)
*H04N 5/907* (2006.01)
*H04N 5/262* (2006.01)

(52) U.S. Cl.
CPC ......... *H04N 5/23267* (2013.01); *H04N 5/2628* (2013.01); *H04N 5/77* (2013.01); *H04N 5/907* (2013.01)

(58) Field of Classification Search
CPC .......... H04N 5/23248; H04N 5/23264; H04N 5/23267; G06T 3/0093
USPC ........ 382/293–297; 348/208.99, 208.4, 208.6
See application file for complete search history.

(56) References Cited

U.S. PATENT DOCUMENTS

| | | | |
|---|---|---|---|
| 6,211,913 B1 * | 4/2001 | Hansen et al. | 348/239 |
| 6,266,452 B1 * | 7/2001 | McGuire | 382/294 |
| 7,705,885 B2 | 4/2010 | Prieto et al. | |
| 8,054,335 B2 | 11/2011 | Deng et al. | |
| 2007/0104383 A1 * | 5/2007 | Jojic et al. | 382/254 |
| 2008/0170126 A1 * | 7/2008 | Tico et al. | 348/208.6 |
| 2009/0033750 A1 * | 2/2009 | Batur | 348/208.1 |
| 2009/0213234 A1 | 8/2009 | Chen et al. | |
| 2010/0165123 A1 * | 7/2010 | Wei et al. | 348/208.4 |
| 2011/0085049 A1 | 4/2011 | Dolgin et al. | |
| 2013/0121597 A1 * | 5/2013 | Hsu | 382/201 |
| 2013/0155279 A1 * | 6/2013 | Khan et al. | 348/231.99 |

FOREIGN PATENT DOCUMENTS

WO     2008114264     9/2008

* cited by examiner

*Primary Examiner* — Timothy J Henn
(74) *Attorney, Agent, or Firm* — Robert C. Kowert; Meyertons, Hood, Kivlin, Kowert & Goetzel, P.C.

(57) ABSTRACT

An image signal processor of a device, apparatus, or computing system that includes a camera capable of capturing video clips may be configured to apply non-warping and warping transformations (including image stabilization transformations) to image data received from the camera's image sensor. The transformations may be applied piecewise to pixels of the image data gathered into multiple line buffers. The line buffers may be divided into vertical slices, each of which may be processed in parallel by a respective portion of the image signal processor circuitry (or circuitry of an output rescaling unit thereof). The image signal processor may not write the received image data to system memory until after the transformations have been performed. By leveraging existing filters and scalers of the image signal processor, rather than a CPU or GPU, image stabilization may be provided that consumes half of the bandwidth and power consumed by existing techniques.

21 Claims, 9 Drawing Sheets

IMAGE STABILIZATION USING STRIPED OUTPUT TRANSFORMATION UNIT

BACKGROUND

1. Technical Field

This disclosure relates generally to image processing, and, more specifically, to image stabilization in a device that includes a camera.

2. Description of the Related Art

When recording a scene with a video capturing device (e.g., a video camera), the captured frames may reflect any motion of the camera caused by a shaking hand, a foot-fall while walking, or other types of disruptions. In some cases, image stabilization techniques can be applied to reduce the amount of motion exhibited in the captured video sequence and/or to reduce the effects of motion caused by the camera's rolling shutter. A variety of techniques may be used to determine the motion reflected in the scene, such as using data from a gyroscope in the camera, or generating motion vectors based on optical flow calculations.

Regardless of how the motion data is generated, the resulting images (e.g., the frames of the video sequence) will require the application of one or more image transformations to adjust for the motion. These transformations can include any combination of offset translation, rotation, scaling, shear transformation and/or perspective transformation. Typically, such operations are applied piecewise to the images to account for the changes in motion during the frame capture due the rolling shutter. Typically, such transformations are applied to each frame of the image data after the data for that image frame is written to system memory. For example, a Graphics Processing Unit (GPU) or similar hardware may access the system memory in order to perform the piecewise transformations to different sections of the image data for each of the frames. Alternatively, software running on a CPU in the system may access the system memory in order to perform such transformations.

SUMMARY

An image signal processor of a device, apparatus, or computing system that includes a camera capable of capturing video clips may, in some embodiments, be configured to apply non-warping and warping transformations (including image stabilization transformations) to image data received from the camera's image sensor. For example, the image signal processor may be configured to apply translation operations, horizontal or vertical scaling operations, rotations, shear transformations, and/or perspective transformations to correct for camera motion in a sequence of image frames (e.g., a tilt, roll, or rotation of the camera during image capture) or to compensate for rolling shutter effects.

In some embodiments, the transformations may be applied in a piecewise manner to pixels of the image data that have been gathered into multiple line buffers within the image signal processor (or an output rescaling unit thereof) after the data is received, where the pixels in each line buffer correspond to a line of pixels in the input image. In some embodiments, the line buffers may be divided into vertical slices, each of which may be processed in parallel by a respective portion of the image signal processor circuitry (or the circuitry of the output rescaling unit thereof). Splitting the lines buffers into vertical slices may allow the image signal processor to perform warping transformations with larger vertical displacements than would otherwise be supported, without the need for larger buffers (or, e.g., a full frame buffer). In some embodiments, the stripes may share existing line buffers and various filter components, as the image signal processor hardware walks through the different stripes applying the appropriate transformations.

By leveraging existing filters and scalers of the image signal processor, rather than a CPU or GPU, image stabilization may be provided that consumes half of the bandwidth and power consumed by existing techniques, in some embodiments. For example, the image signal processor may not need to write the received image data to system memory until after the image stabilization transformations have been performed. By eliminating costly memory transfers between the system memory and the CPU or GPU, the cost of implementing image stabilization for video capture (in terms of memory bandwidth and power consumption) may be reduced, as compared to exiting image stabilization methods.

Figure 1:
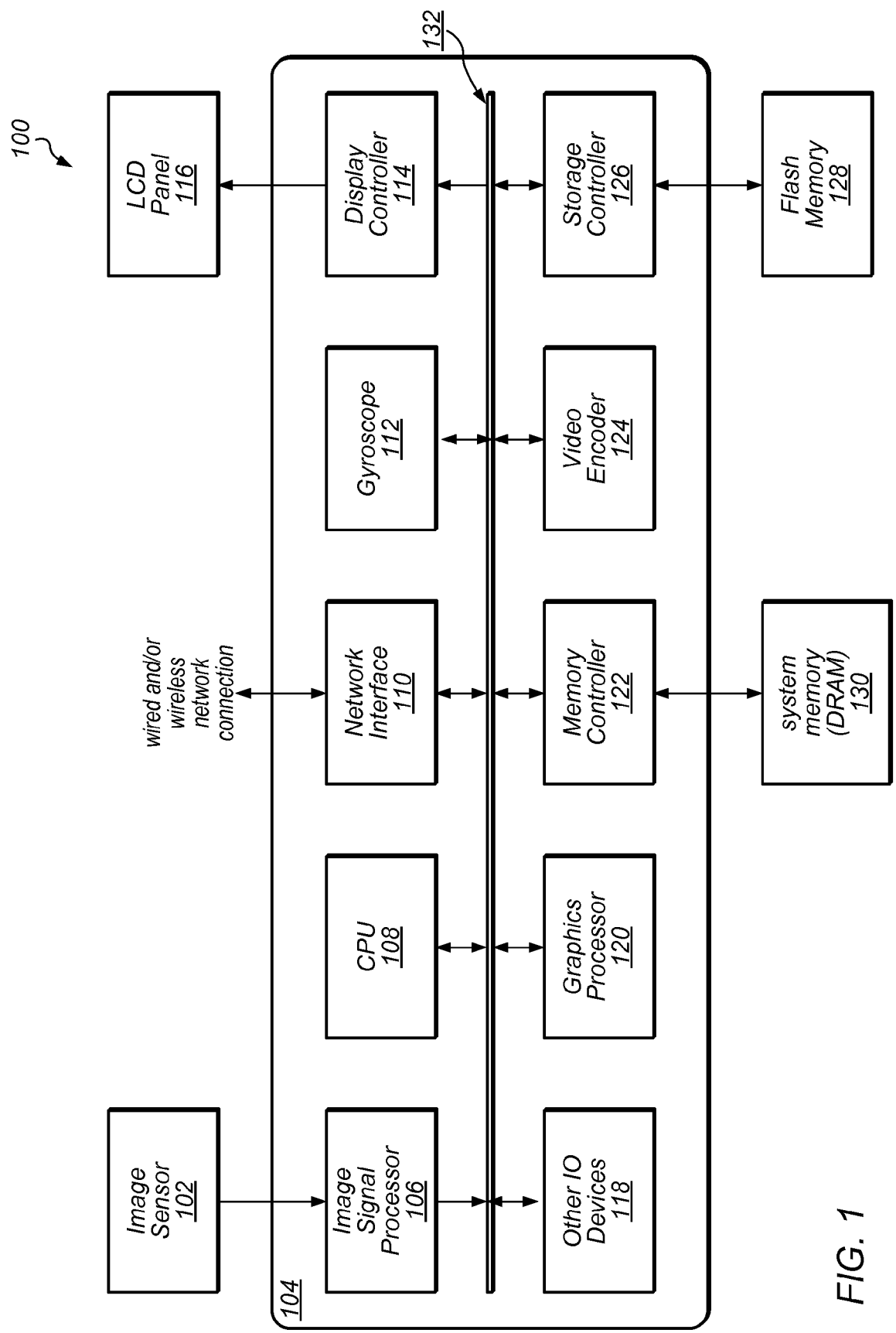
FIG. 1 is a block diagram illustrating one embodiment of a system that performs image stabilization transformations.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As noted above, image stabilization techniques may be applied to reduce the amount of motion reflected in the images obtained from a video recording device that are caused by a hand shaking, a foot-fall, or other disturbances, and/or to reduce the effects of motion due to the rolling shutter of the video recording device. For example, warping and/or non-warping image transformations may be applied in order to (at least partially) compensate for translational motion (e.g., motion of the camera to the left, right, up, and/or down), rotational motion (e.g., yaw, pitch, rolling left, or rolling right), and/or perspective distortion (e.g., distortion caused by tilting the camera slightly). In addition, since the pixels on the image sensor of a video camera are typically scanned out over time using a rolling shutter (rather than a shutter that opens, captures light for a full-frame image, and then closes, as with a still camera), there may be rolling shutter effects for which to compensate. For example, there may be a change in a scene being recorded between the time at which the top half of an image frame is captured and the time at which the bottom half of the image frame is captured, resulting in rolling shutter artifacts that are similar in some ways to the effects of camera motion. Note that references to a "camera", a "video camera", or a "video recording device" in the descriptions that follow do not necessarily refer to a single-purpose device for capturing still images or video, but may refer more generally to any device, apparatus, or system that is configured to capture and process image data, including sequences of images (e.g., video clips).

In different embodiments, image stabilization may be performed in a variety of ways by the systems described herein, and typically includes the following operations. First, the system may be configured to determine the motion of the camera over the scene (or a rolling shutter artifact similar to that caused by such motion). Second, the system may adjust the image to at least partially correct the image (to compensate for the determined motion) using one or more transformations. In some embodiments, determining the motion may include receiving and using data from a gyroscope in the camera (e.g., a gyroscope that is integrated on the same device that contains the CMOS image sensor of the camera, or a gyroscope that is implemented by a separate MEMS device in the system). In other embodiments, determining the motion may include generating motion vectors based on optical flow calculations. As noted above, regardless of how the motion is determined and the corresponding motion data is generated, transformations may be applied to the resulting image to adjust for the determined motion. In other words, the second operation described above may include determining how to transform the image data for the scene (e.g., what non-warping and/or warping transformations to apply) to compensate for the motion. In various embodiments, these transformations may include any combination of offset translation, rotation, scaling, shear transformation and/or perspective transformation.

In some embodiments, image stabilization operations involving one or more warping and/or non-warping transformations may need to be applied piecewise to the image, due to the changes in motion during the frame capture (e.g., due to the rolling shutter and/or the actual movement of the camera during the frame capture). For example, if the camera moved left, then right, during capture of data for a single frame, so that the top of the image shifted to the right, the bottom of the image shifted to the left, it may be necessary to apply different adjustments to these different portions of the image in order to compensate for the camera movement and the rolling shutter effects. In some embodiments, the systems described herein may be configured to determine different motion vectors for different portions of a frame (i.e., different portions of an image in a sequence of images) and to apply different transformations to those different portions. In some embodiments, the systems described herein are configured to apply various transformations in a piecewise manner to different groupings of lines of pixels that correspond to lines of pixels in the image (i.e., the input image). For example, in one embodiment, the system may apply transformations piecewise to groups of 32 lines at a time (e.g., operating on one 32-line buffer at a time). For each 32-line slice, the system may be configured to determine and apply a respective transformation, or a respective set of transformations, each of which may include rotation, scaling, shear transformation, perspective transformation and/or another type of warping transformation, to compensate for the motion of the camera.

In some embodiments, the number of lines of pixels in the line buffers may be pre-determined and/or may be configurable or tunable by the user, and may be based on the desired granularity of the image stabilization operations. In other embodiments, the number of lines of pixels that are processed in the buffers using the same parameters (i.e., the height of the horizontal slices) may be variable within the image. For example, in one embodiment, transformation parameters may be defined with higher granularity (e.g., defining different parameter values for each set of eight lines) in the most important portion(s) of an image (e.g., in the middle of the image, or in the portion of the image containing the subject of the image), while transformation parameters may be defined with less granularity (e.g., defining different parameter values for each set of 64 lines) in less important portions of the image (e.g., at the top and bottom of the image). In still other embodiments, transformation parameters may vary across a single line of pixels. Note that in some embodiments, the system may be configured to smoothly interpolate between the lines of pixels transformed by different parameter values (e.g., near the boundaries between the horizontal slices or across all of the lines in each slice). For example, in one embodiment in which different transformation parameters are re-defined every 32 lines, the first line of a slice may use the parameter values in a first set of parameter values, and the $32^{nd}$ line of the slice may use the parameter values of the next set of parameter values. In this example, the parameter values applied to the lines in between may be the result of a linear interpolation between the two, such that for the $16^{th}$ line, the values applied to the line may be the result of an equal weighting between the two sets of parameter values. In other embodiments, there may be a non-linear weighting between the two sets of parameter values (e.g., based on the position of the slice within the image, the relative importance of the different slices in the image, or on other factors).

As noted above image stabilization transformations are typically applied to image data after it has been captured and written out to system memory. For example, some systems use a Graphics Processing Unit (GPU) or similar hardware to apply piecewise transformations to different sections of the images written out to system memory, or may execute software on a CPU to perform similar tasks. In other words, typically, after image data for a frame (which may have already been down-scaled by a component of an image signal processor or image processing pipeline) is written to system memory, the GPU or CPU may read the data out of the system memory and apply some type of filtering operation(s) to the image data to perform image stabilization. For example, the GPU or CPU may apply a resampling filter to the image data to shift it by an integer or real number (e.g., a fractional number) of pixels. The GPU or CPU may then write the resulting image data (i.e., the image data as modified by the transformation) back out to the system memory from which it may be accessed for display or other purposes. GPUs may be well suited for performing resampling for perspective transforms, for example, since they may include dedicated hardware for efficiently processing image data in that way. Some systems may include custom hardware for performing these types of warping transformations, again by accessing image data for each frame from the system memory and applying one or more transformations to that data.

However, all of these existing approaches are memory-to-memory transformations that require the entire image to be present in the device memory. Therefore, using these existing techniques, the image data will typically touch system memory four times: once when the camera and image processor write out the data for the initial (input) image to the system memory, a second time when the GPU or CPU reads the initial image data, a third time when the GPU or CPU writes out the image data following its transformation, and a fourth time when the ultimate output device (e.g., a display or a video encoder) reads the transformed data out of the system memory for video encoding or display. Typically, in a system that does not perform image stabilization, the video capture device (which includes an Image Signal Processor, or ISP) would write out a finished image and the output device would read it. Therefore, the cost of performing image stabilization typically includes two additional operations to access the system memory (once to read out the data for the image and once to write the data for the image). These additional memory accesses can affect the performance of the system (e.g., by double the amount of memory bandwidth required) and increase the power consumption of the system for the video capturing operation. This additional bandwidth and power can be non-trivial in some cases, given the data rates associated with recording high-definition video at high frame rates. As an example, a high-definition video with 1080p resolution at 60 frames per second may require an additional 500 MB/second of bandwidth to perform image stabilization using the GPU (which is a hardware solution) or using the CPU (e.g., a software solution).

In some embodiments, the systems described herein may perform image stabilization as part of the operation of the image signal processor. In other words, these systems may take advantage of the existing hardware of the image signal processor (or a modified version of the image signal processor) to perform various warping transformations as part of its image flow. In some embodiments, the image signal processor may include one or more image processing filters at the end of its flow that are used to reduce the resolution of the camera input to a suitable output resolution for display as a preview or for video encoding, or for implementing a digital zoom. For example, many camera devices are configured to take both high-resolution megapixel stills and to perform lower-resolution video capture, and they include an output scaler to down-scale the high-resolution camera input to the lower-resolution video (e.g., down-scaling input image data from 5-9 megapixels to something more suitable for video encoding).

In some embodiments, such a scaler (sometimes referred to herein as an output rescaling unit) may already be able to handle translations and scaling, and may be modified to perform piecewise transformations that can apply arbitrary transformations, including rotations and perspective. In other words, in some embodiments, an existing or modified image signal processor may be leveraged to perform image stabilization, e.g., by configuring it to perform other types of filtering operations (e.g., warping filters) and to apply those filtering operations to different portions of an input image, according to various parameters. In some embodiments, the image signal processor may also be modified to store additional parameters needed to allow different filtering operations to be applied to different portions of the image. By performing both the non-warping operations of a typical image signal processor and warping operations using the image signal processor as part of the image flow through the image processing pipeline, the additional system memory operations (and corresponding bandwidth and power consumption) typically associated with image stabilization may be avoided.

Note in addition to memory bandwidth and power savings, the techniques described herein may also provide opportunities for quality improvement. For example, the GPU method described above will typically require the resolution of the output of the image signal processor to be the same as (or near) the video resolution e.g., in order to minimize the amount of data the GPU needs to process, and in order to minimize the bandwidth requirements for the extra system memory read and write operations. However, in some embodiments of the systems described herein, the image signal processor may be configured to maintain the image data at the higher camera resolution, or at some intermediate resolution, until after the image stabilization transformation(s) have been performed, and to perform the down-scaling operation as part of these transformations. This may result in a noticeable increase in quality over the GPU method described above, since only one filter is applied to the image data instead of two.

As noted above, in some embodiments, there may be a certain amount of state that needs to be maintained for the optical flows when performing piecewise transformations. For example, in embodiments in which transformations are applied to line buffers containing 32 lines of pixel data, the system may need to maintain a transformation matrix (e.g., 6 or 9 numbers) for each 32-pixel-high slice, indicating how each of the pixels in that slice are to be transformed (e.g., given their x, y, and z coordinate values). For example, the transformation matrix may indicate that the value of the x coordinate for each pixel in the slice should be multiplied by a specified scale factor and then a specified constant should be added to it. The transformation matrix for each slice may in various embodiments be a 3×2 matrix (e.g., for horizontal and/or vertical translations and scaling), or a 3×3 matrix (e.g., for perspective transformations, which utilize a "z" coordinate value). In this example, for a piecewise transformation applied to an image with 1080p resolution, the system may need to store 34 such sets of numbers (i.e., 34 transformation matrixes), one for each of 32 collections of line (each 32 pixels tall), rather than one set of transformation matrix numbers that are to be applied to an entire frame (without piecewise transformations). In some embodiments, the system may also include hardware for controlling how the system steps from slice to slice and the transformation matrix that is applied at each step (selecting the correct transformation for each slice).

In general, the transformation operation applied at each point in the image may include, for each output pixel, determining where the value of the output pixel can be found in the input image data (which may be an input pixel or may involve an interpolation between multiple input pixels, according to a fractional coordinate value), and applying a filter to resample the input image at that point to generate the output pixel. In some embodiments, performing such operations in a piecewise manner may require that the system consider and/or maintain more transformation parameters than would be required using the GPU or CPU methods described above.

Note that performing image stabilization operations using the image signal processor as part of its image flow may in some embodiments result in a delay in that image flow. However, in some embodiments, there may be delays for other reasons (e.g., frame delays) at various points in this flow, and any additional time to process the image due to performing image stabilization may be largely (or entirely) subsumed by those delays. In one example, the image signal processor may include a temporal filter that performs frame-to-frame comparisons, and this may cause a frame delay during which the system may gather gyroscope data or perform other operations necessary for programming the output rescaling unit to perform image stabilization when the image data reaches that stage of the image processing pipeline.

In some embodiments, the system may not necessarily be able to determine the motion of the camera before data for the entire frame has been received. However, delays earlier in the image processing pipeline may be taken advantage of, or the input from the camera sensor may be stored before it is passed to the image signal processor, which may result in a frame lag, but not a longer image processing time in the pipeline. In another example, in an embodiment in which the image signal processor includes a temporal filter, the system may be configured to detect, using the optical flow, what the motion vectors are as the lines of pixel data are received (e.g., before the image data for the whole image is available). In such embodiments, there may be a delay less than the time to process one frame. In another example, there may be delays due to processing and/or buffering between the stages of the image processing pipeline, which may be taken advantage of to avoid frame delays entirely (e.g., by shifting the determination of motion vectors toward the end of the image processing flow, just prior to they are needed by the output rescaling unit to perform image stabilization transformations).

Example System

The techniques described herein for performing image stabilization may be further illustrated in terms of an example system that employs them. As noted above, these techniques may be implemented in any type of camera, apparatus, or computing system that includes the capability to capture and process image data, including video clips. One example of a system that is configured to implement any or all of the techniques described herein is illustrated in FIG. 1. For example, system 100 illustrated in FIG. 1 may be configured to perform image stabilization using an image signal processor without the additional system memory operations required by existing GPU and CPU approaches. In the illustrated embodiment, system 100 includes an image sensor 102, a system-on-a chip (SOC) component 104, system memory (e.g., DRAM) 130, flash memory 128, and an LCD panel 116. In this example, image sensor 102 may be any type of image sensor suitable for capturing image data (e.g., an image sensor that is responsive to captured light), such as an image sensor on a camera, video camera, or other device that includes a camera or video camera. In this example, LCD panel 116 may be configured to display a preview of captured still images and/or video clips. LCD panel 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, a gyroscope 112 (from which motion data may be gathered), a display controller 114 (which is coupled to and controls the operations of LCD panel 116), a graphics processor (GPU) 120, memory controller 122 (which is coupled to system memory 130), a video encoder 124, a storage controller 126 (which is coupled to and controls access to flash memory 128), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

While in the example illustrated in FIG. 1, system memory 130 is shown as dynamic random access memory (DRAM), in other embodiments, system memory 130 may be any type of memory, such as synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data in various formats. Similarly, while the example system 100 illustrated in FIG. 1 includes flash memory 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multitouch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including LCD panel 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 5 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 126) into a format suitable for use by another component (e.g., CPU 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data to various functional unit in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Figure 2:
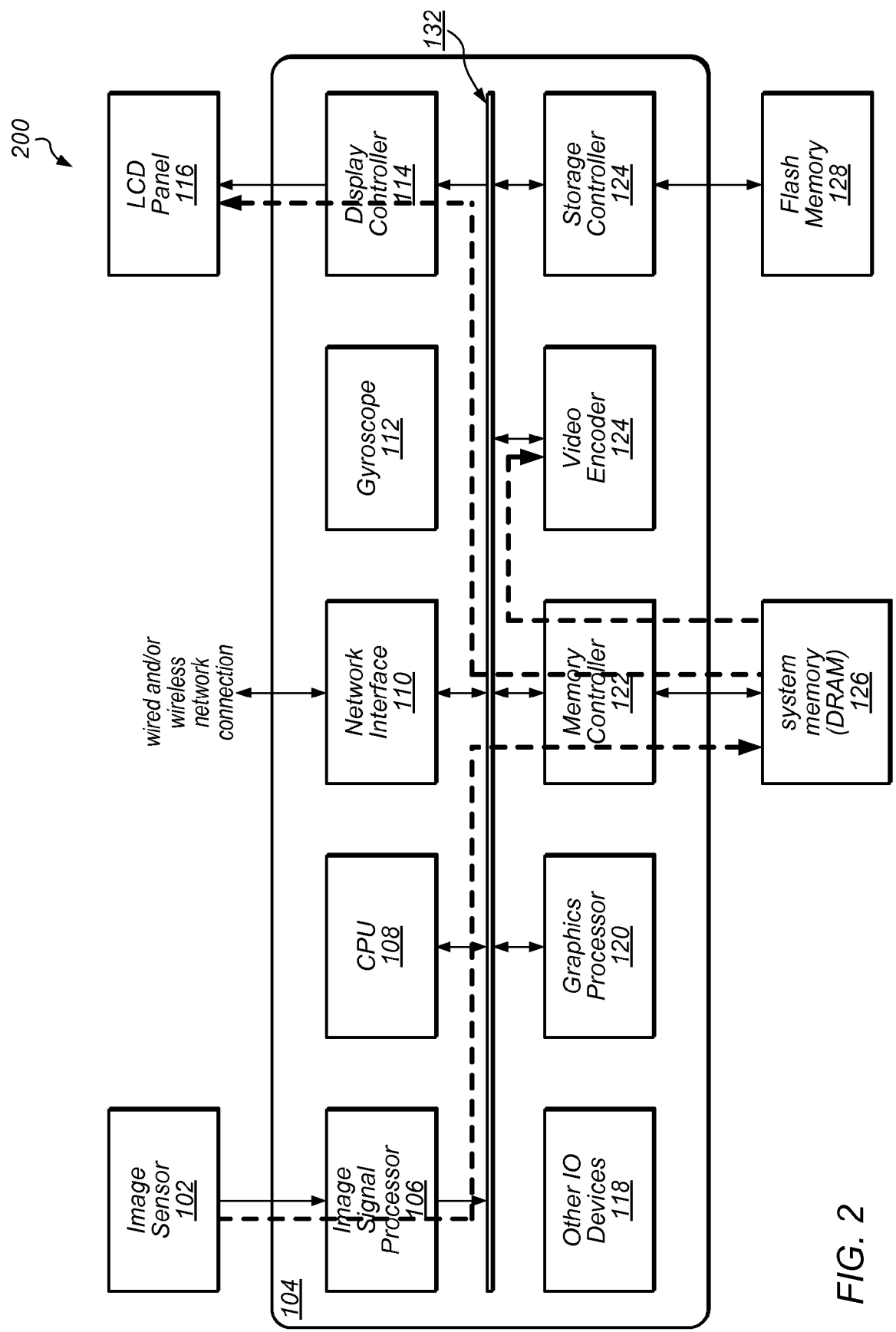
FIG. 2 and FIG. 3 are block diagrams illustrating various data paths in a system that performs image stabilization transformations.
Figure 3:
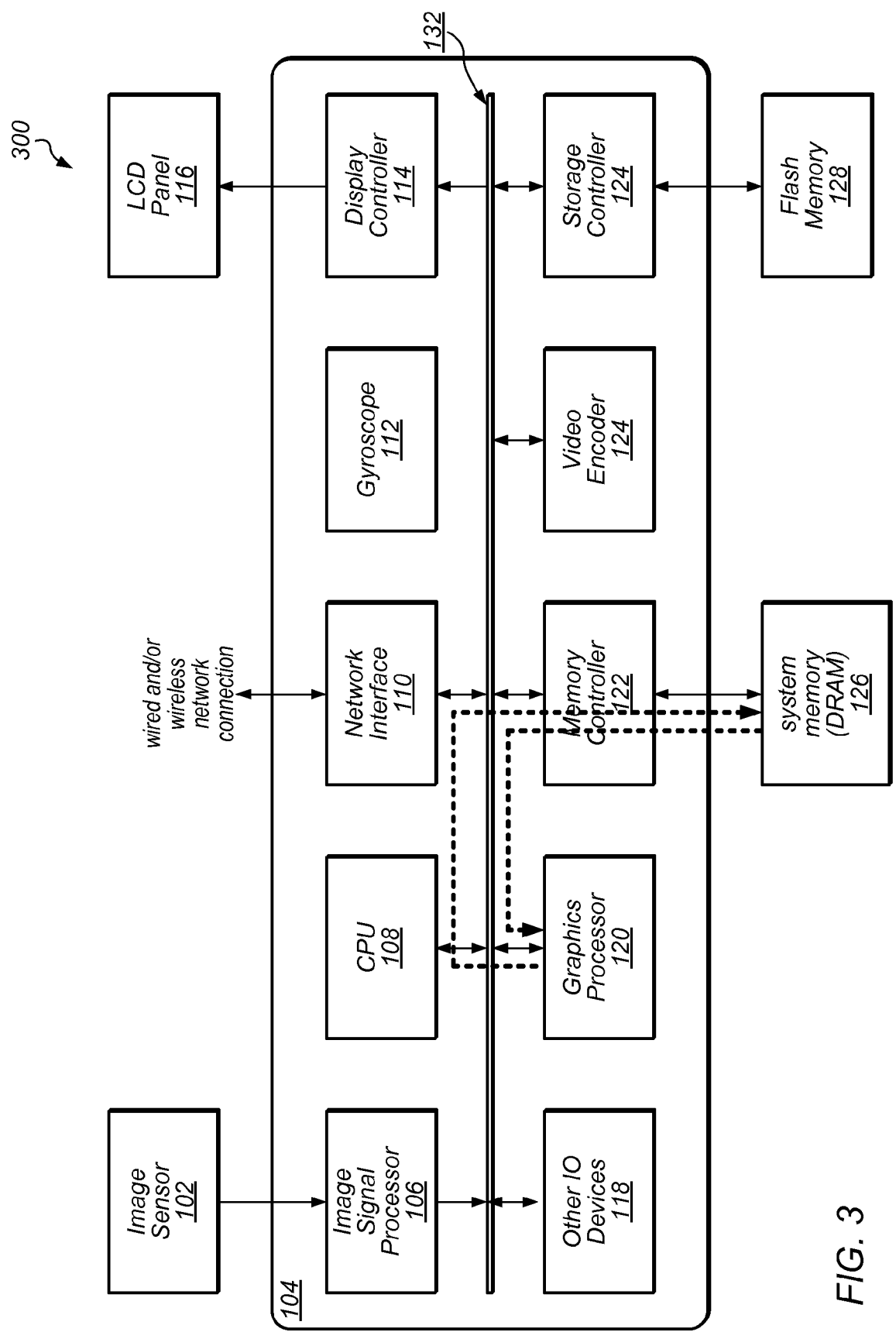

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 126 may be executed by CPU 108 and/or GPU 120 to provide various functions of system 100. In other embodiments, various functions may be performed by software components executing in memory on another device and communicating with the illustrated system via inter-computer communication. Some or all of these software components and/or any data structures described herein may be stored (e.g., as instructions or structured data) in system memory 126, in flash memory 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile FIG. 2 and FIG. 3 are block diagrams illustrating various data paths in a system that performs image stabilization transformations (specifically, in system 100 illustrated in FIG. 1), according to some embodiments. For example, FIG. 2 illustrates various paths for non-stabilized video data in system 100, according to some embodiments. As illustrated by the dashed lines in this example, non-stabilized video data may pass from the image sensor of the camera (102), through the image signal processor (106) to system memory 126 (by way of interconnect 132 and memory controller 122). As illustrated in FIG. 2, once the non-stabilized video data has been stored in system memory 126, it may be accessed by video encoder 124 and/or LCD panel 116 (e.g., by way of interconnect 132 and, in the case of LCD panel 116, display controller 114). For example, it may be accessed by display controller 144 in order to display a preview on LCD panel 116, or may be accessed by video encoder 124, which may encode the data in a format suitable for video recording to flash memory 128 (e.g., for storage), or for passing the data to network interface 110 for transmission over a network (e.g., for a video conference) or elsewhere, in various embodiments.

As described herein, if image stabilization is performed in system 100 using graphics processor 120, additional read and write operations may be performed on system memory 126 beyond those illustrated in FIG. 2. These additional accesses are illustrated by the dotted paths shown in FIG. 3. As illustrated in FIG. 3, the non-stabilized video data that was stored in system memory 126 may be accessed by GPU 120 (by way of interconnect 132 and memory controller 122), and, after GPU 120 has performed one or more image stabilization transformations on the video data, the stabilized video data may be written back to system memory 126 (again, by way of interconnect 132 and memory controller 122). Similar data paths may be employed in system 100 between system memory 126 and CPU 108 if image stabilization is instead performed by CPU 108 (e.g., by software executing on CPU 108).

However, if image stabilization is performed in system 100 using image signal processor 106, as described herein, the data paths illustrated in FIG. 2 as dashed lines may also apply to the movement of image-stabilized video data in system 100. In other words, in some embodiments, non-stabilized video data may pass from the image sensor of the camera (102), to the image signal processor (106), wherein one or more transformations are applied to the data (including one or more image stabilization transformations). In this example, only after these transformations have been applied to the non-stabilized video data would the video data (which is now image-stabilized video data) pass to system memory 126 (by way of interconnect 132 and memory controller 122). As illustrated in FIG. 2, once this image-stabilized video data has been stored in system memory 126, it may be accessed by video encoder 124 and/or LCD panel 116 (e.g., by way of interconnect 132 and, in the case of LCD panel 116, display controller 114).

Figure 4:
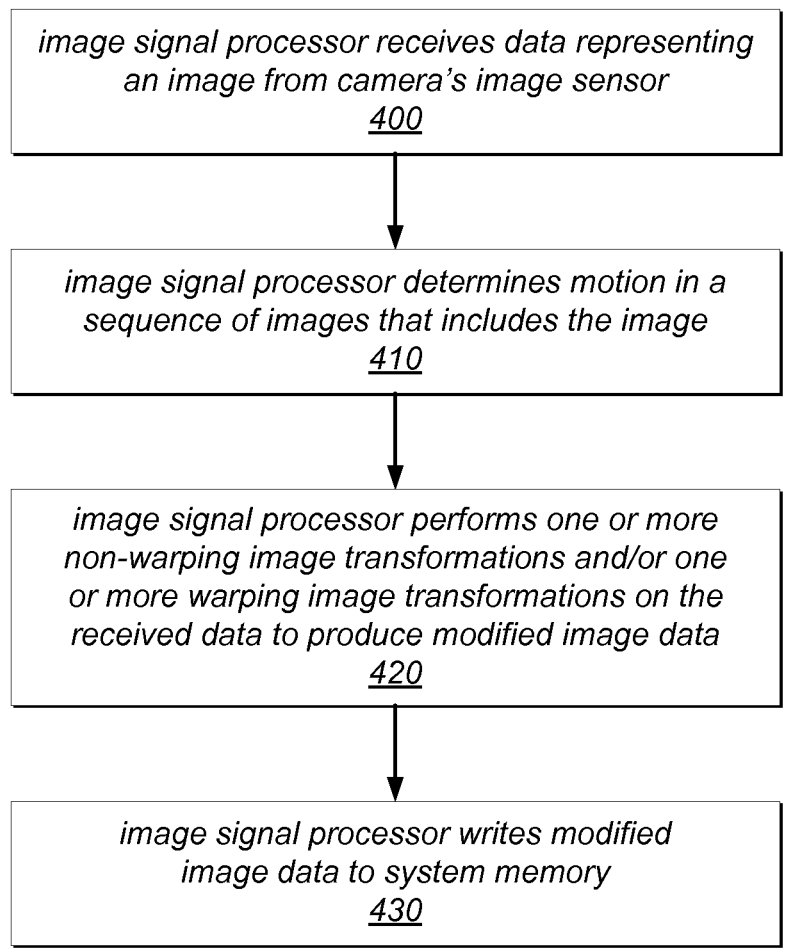
FIG. 4 is a flow diagram illustrating one embodiment of a method for performing image stabilization transformations.

One embodiment of a method for performing image stabilization transformations is illustrated by the flow diagram in FIG. 4. As illustrated in this example, the method may include an image signal processor receiving data representing an image from camera's image sensor (as in 400). As previously described, the image signal processor may, in various embodiments, be a component of any type of device that includes a camera capable of capturing video clips (e.g., a camera, video camera, smart phone, tablet device, or portable multifunction device or other apparatus or system that includes such a camera). The method may include the image signal processor determining motion in a sequence of images that includes the image (as in 410). This determination may be performed using any of a variety of techniques, including, but not limited to, those described herein (e.g., gathering motion data from a gyroscope component of the device or generating motion vectors based on optical flow calculations), in different embodiments.

As illustrated in this example, the method may include the image signal processor performing one or more non-warping image transformations (e.g., horizontal or vertical scaling, or a translation in one or more dimensions), and/or one or more warping image transformations on the received data (e.g., an image stabilization transformation such as a rotation, a shear transformation, or a perspective transformation) to produce modified image data, as in 420. In some embodiments, to perform these transformations, the image signal processor may be configured to generate a transformation matrix by which the image signal processor (or various scaling and/or filtering units thereof) may perform a non-warping transformation (e.g., a scaling transformation) or a warping transformation, or to perform both a non-warping transformation and a warping transformation at the same time. Note that, as described in more detail with reference to FIG. 5, the image signal processor may perform other types of image editing or correction operations (e.g., color correction, sharpening, etc.).

As illustrated in FIG. 4, the method may include the image signal processor writing the modified image data out to a system memory (as in 430), which may include providing the modified image data to a memory controller interface that is included in the camera-type device and that is coupled to the system memory. Again note that in some embodiments, the image data received from the camera's image sensor may only be provided to the memory controller and/or written to the system memory after any suitable non-warping and warping transformations have been applied to the image data (e.g., for image stabilizing, scaling, and/or other purposes).

Figure 5:
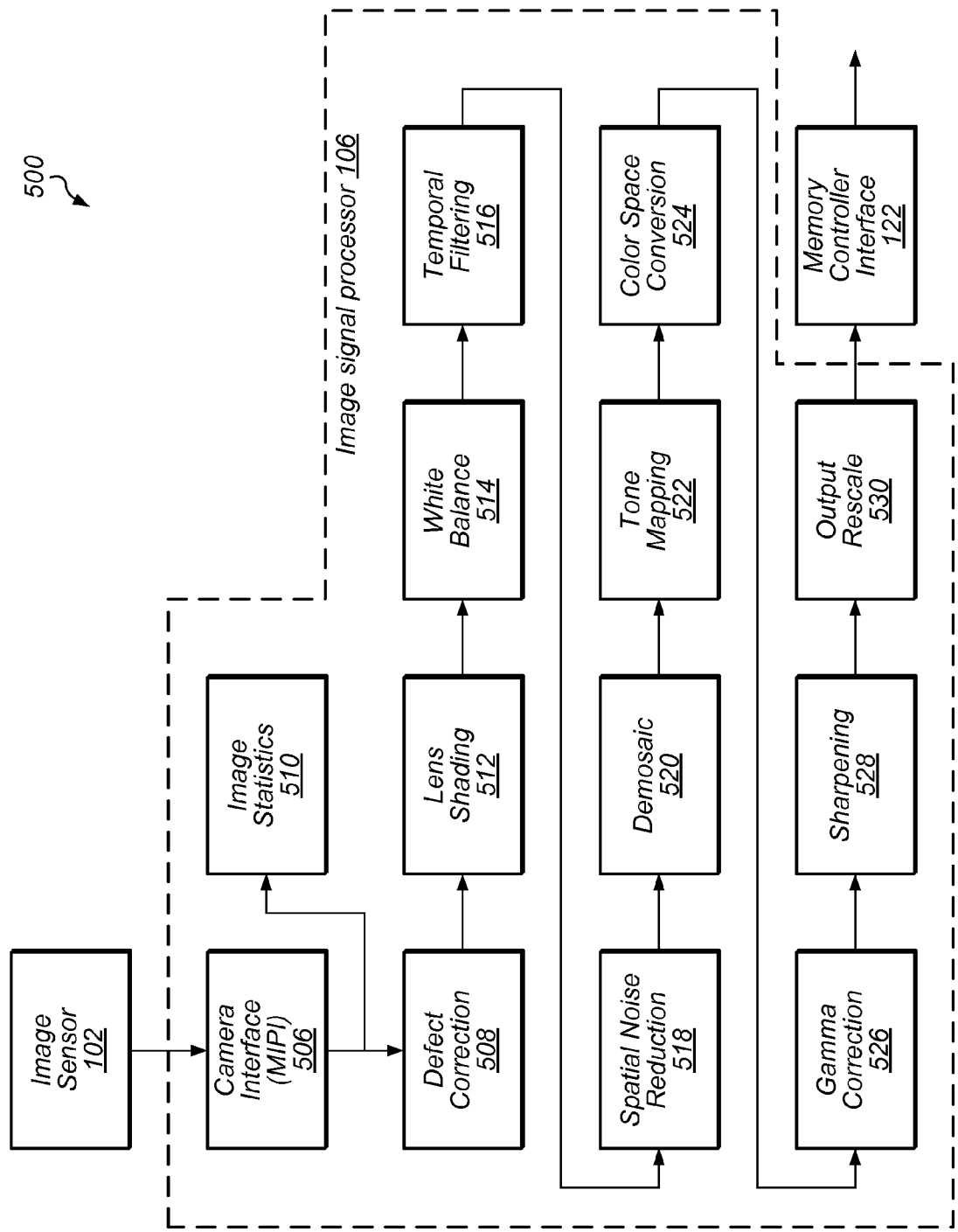
FIG. 5 is a block diagram illustrating one embodiment of an image signal processor.

One embodiment of an image signal processing unit (ISP), such as image signal processor 106, is illustrated by the block diagram in FIG. 5. As illustrated in this example, ISP 106 may in various embodiments be coupled to an image sensor 102 (from which it receives image data) and a memory controller interface 122 (through which it writes transformed image data to a system memory). In this example, ISP 106 implements an image pipeline, i.e., a set of stages that process image information from creation (or capture) to output. For example, the various elements illustrated as components of ISP 106 process source data received from image sensor 102 through camera interface 506 into image data usable by other stages in the pipeline, by other components of a system that includes ISP 106 (including those that access the transformed data from the system memory after it is written to the system memory via memory controller interface 122), and/or by other devices coupled to the system that includes ISP 106.

In the illustrated embodiment, ISP 106 includes an image statistics unit 510, a defect correction unit 508, a lens shading unit 512, a white balance unit 514, a temporal filtering unit 516, a spatial noise reduction unit 518, a demosaic unit 520, a tone mapping unit 522, a color space conversion unit 524, a gamma correction unit 526, a sharpening unit 528, and an output rescale unit 530, any or all of which may operate on the image data received by camera interface 506 prior to the image data (as modified by these functional units of the image processing pipeline) being provided to memory controller interface 122. Note that, in various embodiments, ISP 106 may include more or fewer components than those shown in FIG. 5. Note also that, in various embodiments, the functionally of units 508-528 may be performed in a different order than the order implied by the order of these functional units in the image processing pipeline illustrated in FIG. 5, or may be performed by different functional units than those illustrated in FIG. 5.

In some embodiments, various non-warping and/or warping transformations (such as those described herein) may be performed by output rescale unit 530. In other words, it may be this component of image signal processor 106 that is configured to perform scaling to provide video data suitable for display, for video encoding etc., and that in some embodiments is also configured to perform filtering operations (e.g., warping transformations) for image stabilization, as described herein, prior to writing out transformed image data to system memory through memory controller interface 122. Note that in some embodiments, all of the functionality of image signal processor 106 (including the operations of camera interface 506, functional units 508-528, and output rescaling unit 530) may be performed in hardware (e.g., by dedicated circuitry within image signal processor 106).

Note that in some embodiments, translations and/or scaling operations may be performed very efficiently on a typical output scaler because these operations are separable operations. For example, a horizontal scaling or translation operation (e.g., a change in width or displacement along the width) may be performed by looking only at the pixels within a horizontal line. The same may be true for vertical scaling or translation operations (e.g., they may be performed by looking only at the pixels within a vertical column). However, this may not be true for operations such as rotation, shear transformations, or perspective transformations, and/or for transformations for correcting rolling shutter artifacts (i.e., these operations may not be separable), since these operations may require pixels from a much larger area. For example, in order to perform a 45-degree rotation of an image, for each horizontal line in the output image, the system would need to sample a 45-degree line in the source image, which would include pixels in many horizontal lines and many vertical columns.

Note that in some embodiments, the image signal processor is a streaming device. In other words, pixels may be received by the image signal processor from the camera in raster order (i.e., horizontally, line by line) and may in general be processed through its various pipeline stages in raster order, until finally being written out as a completed image to memory in raster order. Therefore in order to perform a non-separable operation such as a rotation, the image signal processor may need to buffer up enough lines of the image to handle the maximum vertical displacement along the output raster scan line. The worst-case scenario would be a 90-degree rotation, which would effectively require a full frame buffer to process, since pixels would be coming from the camera in a horizontal raster order, but leaving in a vertical raster order. In this case, a typical output scaler may not be able to produce the first (vertical) line for the output until it has seen the last (horizontal) line from the camera input.

In some embodiments, however, the system may be configured to handle rotations by smaller amounts without the need for such extensive buffering. For example, by configuring an output rescaling unit to perform piecewise transformations, the image signal processor may be able to apply image stabilization transformations in small amounts (e.g., up to a per-determined limit, based on the extent to which the problem is sub-divided, i.e., the size of the available buffers). In other words, in order to handle a small non-separable transformation (e.g., a small amount of rotation or another small warping transformation), the image signal processor may be configured to buffer a small portion of the frame.

Figure 6:
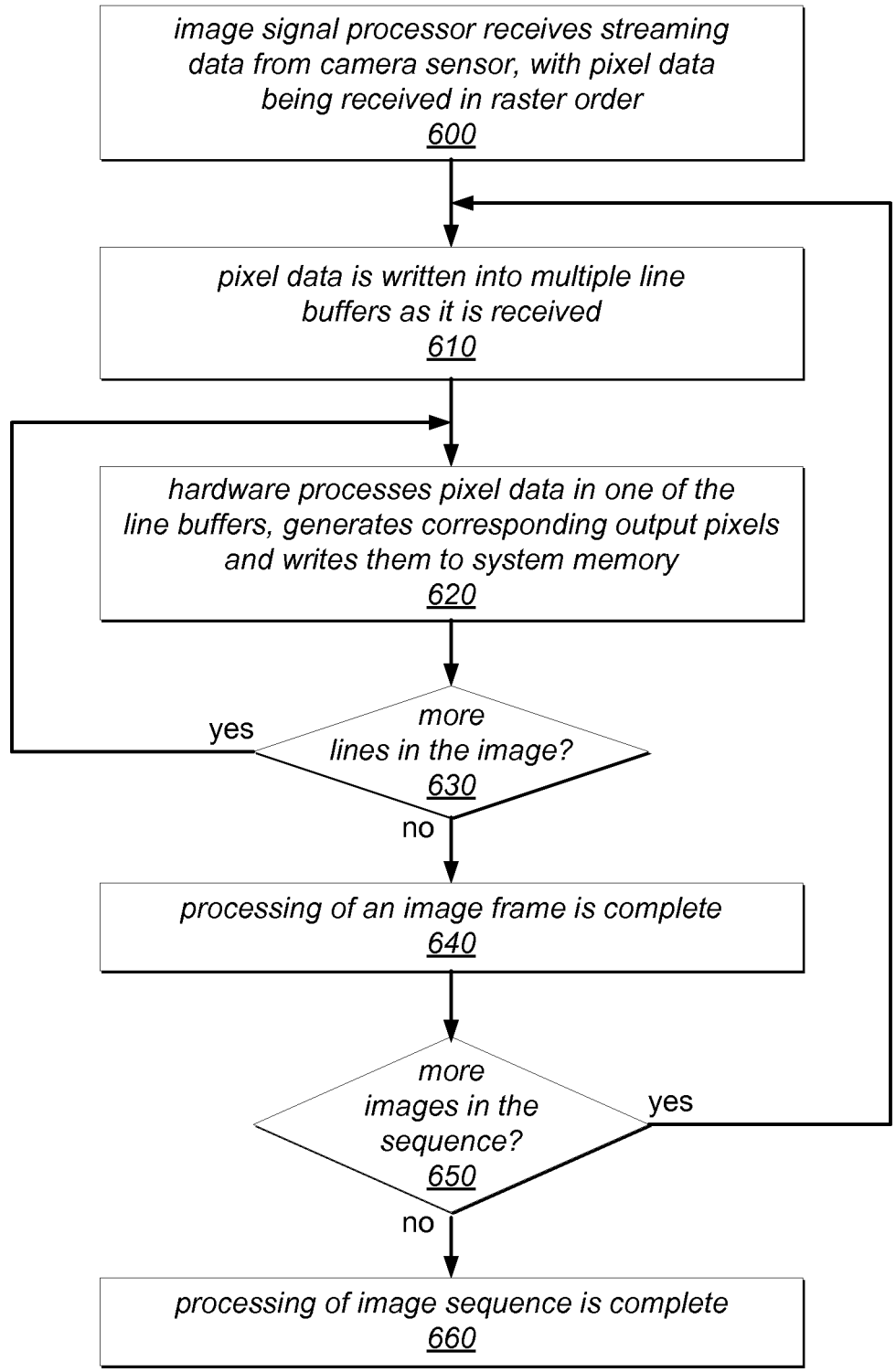
FIG. 6 is a flow diagram illustrating one embodiment of a method for performing piecewise warping or non-warping image transformations.

One embodiment of a method for performing piecewise warping or non-warping image transformations is illustrated by the flow diagram in FIG. 6. In various embodiments, this method may be employed to apply separable operations or small non-separable operations to video data (or, if large buffers are available, larger non-separable operations). As illustrated in this example, the method may include an image signal processor receiving streaming data from a camera sensor, with pixel data being received in raster order (as in 600). In other words, the pixel data may be received horizontally, line by line, as from a rolling shutter, in some embodiments. The method may also include the image signal processor writing pixel data into multiple line buffers as it is received (as in 610). For example, for each image in a sequence of images, the image signal processor may be configured to clear the line buffers and reset an output buffer pointer so that it points to the first line. Then, for each line in the image, the image signal processor may be configured to add the line to the buffers (deleting the oldest line, if necessary). Note that in some embodiments, these line buffers may be implemented within an output rescaling unit, which may be near the end of the image processing pipeline, such that the pixel data received from the camera sensor may be operated on by other functional units within the image signal processor (such as those illustrated as 508-528 in FIG. 5) before it is written into the line buffers of the output rescaling unit.

As illustrated in this example, the method may include hardware (e.g., dedicated circuitry within the image signal processor) processing the pixel data in one of the line buffers (e.g., applying one or more non-warping or warping transformations, which may include image stabilization transformations), generating corresponding output pixels, and writing the output pixels to system memory (as in 620). For example, while there are enough input lines in the lines buffers to generate an output line, the image signal processor may be configured to generate an output line, write the generated output line to memory, and then advance the output buffer pointer to the next line. If there are more lines of pixels in the image (shown as the positive exit from 630), the method may include repeating the operations illustrated at 620 until all of the pixel data in all of the lines of a given image frame have been processed, shown as the negative exit from 630. This is illustrated in FIG. 6 as the feedback from 630 to 620. As noted above, the line buffers may be re-loaded with pixel data multiple times for a given image frame as that pixel data is received and processed, and as the output data is written out to system memory.

As illustrated in FIG. 6, once the processing of an image frame is complete (as in 640), if more image data is received, i.e., if there are more images in the sequence (shown as the positive exit from 650), the method may include repeating the operations illustrated at 610-640 to process data for additional image frames. This is illustrated in FIG. 6 as the feedback from 650 to 610. In other words, the method may include the hardware within the image signal processor stepping through the line buffers (in order) to perform various non-warping and/or warping transformations as the data is streamed in from the camera sensor, until no additional data is received (shown as the negative exit from 650), and the processing of the sequence of images is complete (as in 660).

Note that the method illustrated in FIG. 6 may, in some embodiments, be suitable for performing some image stabilization transformations (e.g., those involving warping the image by a small amount) and may not require buffering a large amount of data. However, in embodiments in which the camera supports HD-resolution video, the amount of data that would need to be buffered to support even small warping transformations using this method may be prohibitive. For example, to correct for a two-degree camera rotation (which is not out of the question for a shaking hand) of a 1080p video, the system would need to process 67 lines of data, or about 250 kBytes of storage, which is a relatively large amount of costly on-chip memory. This does not include additional lines that may be required to perform a good vertical filtering for downscaling.

Note that a streaming device (such as a camera-type device) may typically include a small line buffer (but not a full frame buffer), which may limit the amount of rotation or tilt (i.e., perspective) can be handled in an image stabilization operation. Typically, the amount of on-chip buffer put on chip (such as SOC component 104, which includes image signal processor 106) is small, and is limited by cost. For example, one existing output scaler of an image signal processor includes a buffer of 24 lines in 1080p video mode, which can handle a roll of 24 pixels over a width of 2k pixels, (i.e., a 0.1% roll), but the camera may experience more roll than this when held by hands that are shaking.

Note that the output scaler may write directly to memory. Therefore, although the image signal processor must operate on pixels in raster order due to the limitations on the camera output, the output scaler, being the last block in the ISP pipeline, may not need to write the pixels to memory strictly in raster order. It can make use of this to allow effectively much more vertical displacement for essentially the same cost, as described below.

In some embodiments, in order to process larger amounts of data for warping transformations (such as those described herein), the existing line buffers may be divided in half (e.g., vertically) and the output scaler may also be divided in half. In other words, the output may be divided into vertical stripes, which may be processed separately. Conceptually, in such embodiments, half of the circuitry of the scaler may be employed to apply the warping transformation to the pixels in half of each line buffer, and the other half of the circuitry of the scaler may be employed to apply the warping transformation to the pixels in the other half of each line buffer. In some embodiments, each half of the scaler may operate on its half of each of the line buffers in parallel. In such embodiments, the divided line buffers may be the same height as before, but may be half as wide. Therefore, the divided line buffers may be able to handle data that exhibits more roll. In various embodiments, the line buffers may be divided an arbitrary number of times, with the caveat that some state may need to be maintained for each of the resulting vertical stripes in order to subsequently write the transformed video data to the output service (since it may not be written out the memory in raster order, but as the processing of different stripes is completed). However, maintaining this additional state does not require much additional hardware (e.g., compared to the avoided cost of larger line buffers). Therefore, the number of stripes into which the line buffers are divided may be an implementation decision. The more stripes there are, the more effectively vertical displacement can be handled.

As previously noted, horizontal and vertical scaling operations are separable. Therefore, these operations may be performed on vertical stripes of the line buffers without dependencies. For non-separable operations (such as rotation and roll), such vertical stripes (or sub-buffers) may be able to handle transformations by small amounts, in some embodiments. In other embodiments, the image signal processor (or the output scaler thereof) may be configured to operate on overlapping vertical stripes of pixels in a line buffer (e.g., so that it may be able to interpolate between pixels in two different vertical stripes). For example, if the line buffers are processed horizontally first, and then vertically, the data required for each successive piecewise application of the transformations may be available when it is needed (i.e., circuitry may not need to look to the left or right when processing each vertical stripe. However, in order to be able to process the line buffers are vertically first, and then horizontally, the circuitry may be configured to divide the data such that the vertical stripes overlap slightly at their boundaries.

In various embodiments, any of these or other striping techniques may allow the system to perform image stabilization transformations without the need for deeper line buffers and may avoid the need to maintain a full frame buffer or write out a full frame buffer to memory. Instead, an image signal processor may in some embodiments be configured to filter input video data once, rather than twice (e.g., rather than first filtering the data down-scale it, and then filtering it again to perform image stabilization) by applying the techniques described herein. In other embodiments, an image signal processor may include two output rescaling units, one of which is configured to generate a preview version (e.g., a down-scaled version) and one of which is configured to generate an encoded version that is both down-scaled and image stabilized.

Again note that in the non-striped case, as pixels stream in from the camera, they may be written into however many line buffers are implemented for the design (e.g., N). To generate a line of output, the hardware may walk through this N-line buffer generating output pixels. In some embodiments, the path that the hardware takes through the buffer (e.g., its starting point, rate of travel, etc.) may be controlled by various piecewise transformation parameters, which may correspond to fractional steps in x and y using a Digital Differential Algorithm (DDA). For a perspective transform, computing the path may also involve stepping a z value and using this to perform a perspective divide on x and y.

Regardless of how the input coordinate is generated, the result of the hardware processing is a coordinate within the line buffers. In some embodiments, this coordinate may have a fractional value which may be used to do interpolation to produce an output pixel. For example, if it is determined that the coordinate is (10.5, 1.5), the hardware may be configured to average the value of the four pixels that represent pixels 10 and 11 from lines 1 and 2. While the path through the input may be a diagonal line, the hardware may be limited in the amount of vertical displacement it can handle by the number of line buffers that are implemented. For example, if N is 25, the hardware may only be able to handle a 25-pixel vertical displacement across the entire horizontal width. If the hardware is handling 1,920-pixel-wide HD video, this corresponds to a maximum rotation of about 0.75 degrees.

Figure 7:
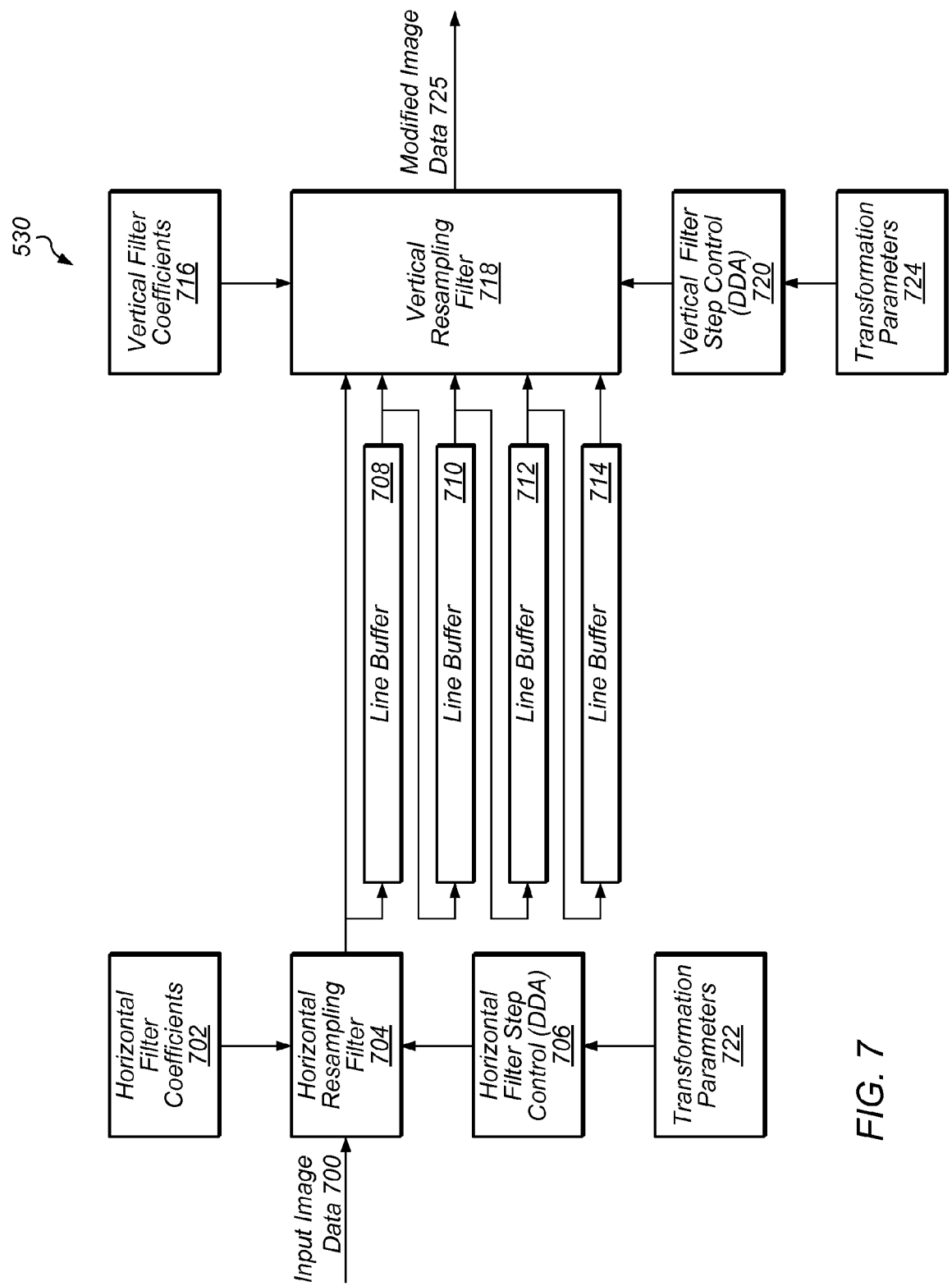
FIG. 7 is a block diagram illustrating one embodiment of an output rescaling unit of an image signal processor.

One embodiment of an output rescaling unit of an image signal processor is illustrated by the block diagram in FIG. 7. As illustrated in this example, an output rescaling unit (such as output rescaling unit 530 illustrated in FIG. 5) may include a horizontal resampling filter 704, multiple line buffers (shown as line buffers 708, 710, 712, and 714), and a vertical resampling filter 718. As shown in FIG. 7, horizontal resampling filter 704 may receive image data 700 from a previous stage in the ISP pipeline, and may also receive horizontal filter coefficients 702 as inputs. Horizontal resampling filter 704 may walk through the image data (writing pixels into the multiple line buffers 708-714) performing the horizontal portion of the transformation under the control of horizontal filter step control unit 706. Note that in some embodiments the horizontal filter may include storage (e.g., a small number of registers) for some amount of horizontal "support" (i.e., pixels in the neighborhood of the interpolation position) that is used in generating its output. Similarly, vertical resampling filter 718 may receive vertical filter coefficients 716 as inputs, and may process the image data in the multiple line buffers, under the control of vertical filter control step unit 720. Since the vertical filter operates on columns of pixels, and since the pixels arrive in raster order, the vertical filter may use the line buffers themselves (i.e., buffering up several lines of pixels data) for its "support".

In this example, horizontal filter coefficients 702 and vertical filter coefficients 716 may be tables containing weightings for the corresponding resampling filters. For example, once horizontal filter step control unit 706 (e.g., a DDA) has determined the fractional pixel position for a given output pixel (which may be referred to as the "filter phase"), this position information may be used to look up an appropriate set of filter weights within horizontal filter coefficients 702 to apply to its support to produce an interpolated pixel for the output. Similarly, the vertical filter step control unit 720 may look up an appropriate set of filter weights within vertical filter coefficients 716 to apply to its support to produce an interpolated output pixel. Note that in other embodiments, horizontal and/or vertical filter weightings may not be stored in tables, but may be computed on an as-needed basis. For example, in some embodiments, elements 702 and/or 716 of FIG. 7 may represent circuitry that implements a simple interpolator. One such interpolator may use two pixels of support and may use weights of F and 1-F to interpolate a fractional value of F (between 0.0 and 1.0). In other embodiments, elements 702 and/or 716 may implement more complex filters, some of which may look up their filter coefficients in a pre-computed table.

In some embodiments, the transformation parameters defined for each horizontal slice or vertical stripe (shown in FIG. 7 as 722 and 724) may be applied to the corresponding step control block (i.e., 706 or 720). In some embodiments, these parameters may be stored in tables (e.g., one for each step control block) that the step control block reads to load new parameters as a piecewise transformation is performed. For example, the parameters may be reloaded for each slice or stripe for which different transformation parameters have been defined. The image data in the multiple line buffers 708-714 may thus be processed to perform various types of non-warping transformations (e.g., translations, horizontal or vertical scaling, etc.) and/or warping transforms (including any of the image stabilizing transformations described herein). The output rescale unit 530 may then write out the transformed image data 725 to system memory (e.g., through memory controller 122).

In one embodiment, the line buffers are 25 lines deep and are divided into two equal-sized vertical stripes of 960 pixels, and the image signal processor is configured to allow each stripe to write out to memory independently. In this example, within each of these stripes, the ISP hardware may be able to handle a 25-pixel vertical displacement across 960 input pixels, which corresponds to a maximum rotation of about 1.5 degrees, or about twice as much rotation as without striping. Taking this concept further, in an embodiment in which the 1,920-wide input is divided into fifteen 128-pixel stripes, each stripe may be able to handle a 25 pixel vertical offset over 128 pixels, or a 11.25 degree rotation.

As previously noted, dividing the line buffers (and the input image) into vertical stripes may have almost zero hardware cost. In some embodiments, it may require that the ISP is able to maintain separate output pointers into the output surface in memory and to handle scattered writes to memory, but these capabilities are not expensive in terms of hardware (i.e., circuitry). In some embodiments, dividing the line buffers may also require that a per-stripe copy of the state associated with each of the steppers that walk the input path through the line buffer source be maintained, but these are also relatively inexpensive hardware costs. In fact, in some embodiments, the most expensive part of the design (i.e., the line buffer storage), as well as some of the other more substantial components (e.g., the resampling filter hardware and/or the DDA hardware), may be shared between various operations, such as when performing the piecewise transformations described herein on different vertical stripes.

Figure 8:
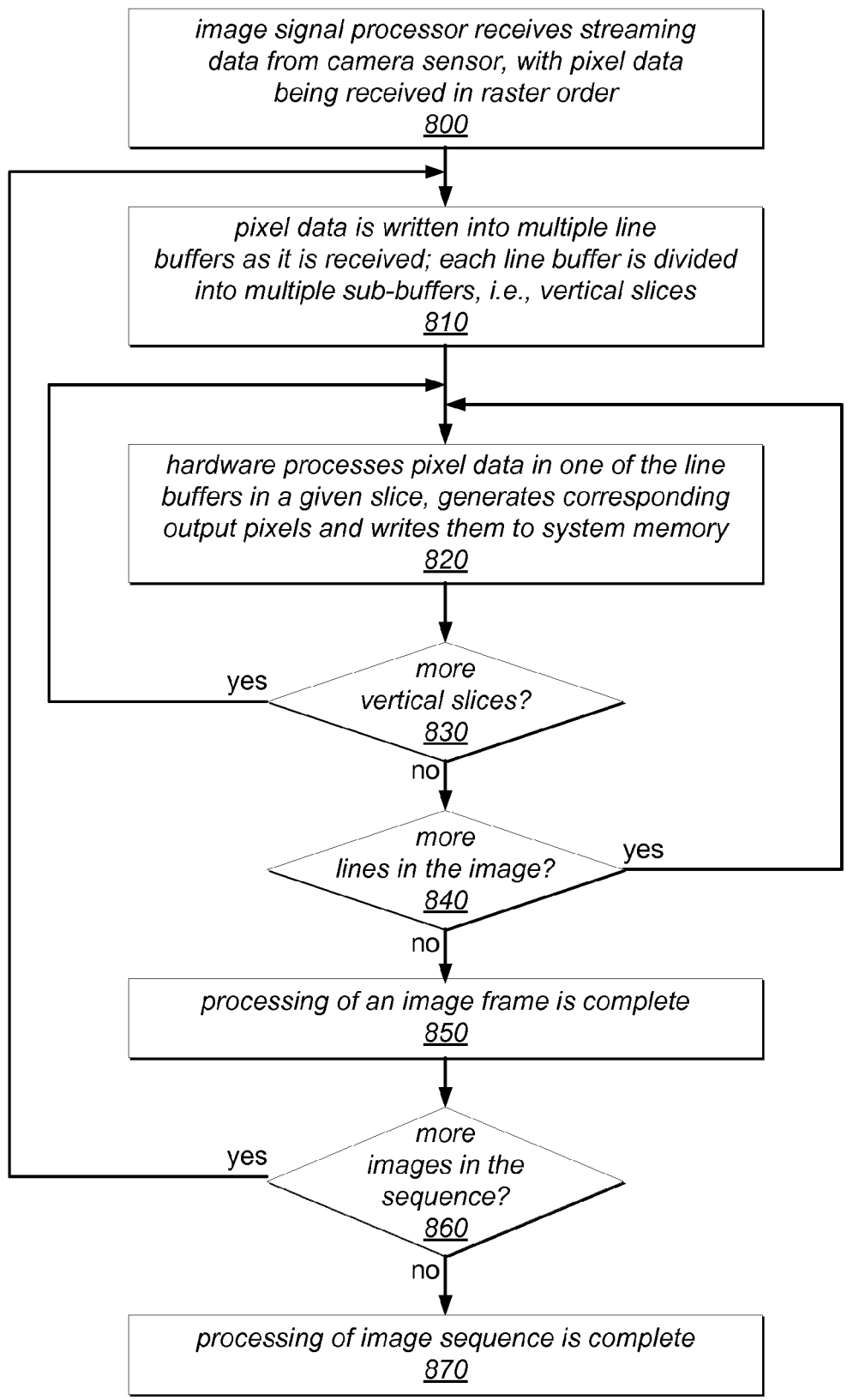
FIG. 8 is a flow diagram illustrating one embodiment of a method for applying piecewise warping or non-warping image transformations to vertical stripes of an image frame.

One embodiment of a method for applying piecewise warping or non-warping image transformations to vertical stripes of an image frame is illustrated by the flow diagram in FIG. 8. As illustrated in this example, the method may include an image signal processor receiving streaming data from a camera sensor, with the pixel data being received in raster order (as in 800). In other words, the pixel data may be received horizontally, line by line, as from a rolling shutter, in some embodiments. As in the previous example, for each image in a sequence of images, the image signal processor may be configured to clear the line buffers and reset an output buffer pointer for each vertical slice so that it points to a segment in the first line. The method may also include the image signal processor writing pixel data into multiple line buffers as it is received, and dividing each of the line buffers into multiple sub-buffers, i.e., vertical slices (as in 810). For example, for each line in the image, the image signal processor may be configured to add the line to the buffers (deleting the oldest line, if necessary). Again note that in some embodiments, these line buffers may be implemented within an output rescaling unit, which may be near the end of the image processing pipeline, such that the pixel data received from the camera sensor may be operated on by other functional units within the image signal processor (such as those illustrated as 508-528 in FIG. 5) before it is written into the line buffers of the output rescaling unit.

As illustrated in this example, the method may include hardware (e.g., dedicated circuitry within the image signal processor) processing the pixel data in one of the line buffers that is in a given vertical slice (e.g., applying one or more non-warping or warping transformations, which may include image stabilization transformations), generating corresponding output pixels, and writing them to system memory (as in 820). For example, for each slice in a line, while there are enough input lines in the buffer slice to generate a partial line in the corresponding output slice, the image signal processor may be configured to generate a segment of an output line, write the generated output line segment to memory, and then advance the output buffer pointer for that segment to the next line. If there are more vertical slices to be processed (shown as the positive exit from 830), the method may include repeating the operations illustrated at 820 for each of the vertical slices until all of the pixel data in all of the vertical slices for the given line have been processed, shown as the negative exit from 830. This is illustrated in FIG. 8 as the feedback from 830 to 820.

As illustrated in FIG. 8, if there are more lines of pixels in the frame being processed, shown as the positive exit from 840, the method may include repeating the operations illustrated at 820-830 for each of the slices in each of those lines until all of the pixel data in all of the lines of the image frame have been processed, shown as the negative exit from 840. This is illustrated in FIG. 8 as the feedback from 840 to 820. Note that the line buffers may be re-loaded with pixel data multiple times for a given image frame as that pixel data is received, processed, and written out to system memory. Note also that some embodiments, the data in the line buffers in multiple vertical slices may be processed in parallel (e.g., with each slice being processed by a corresponding portion of the hardware). In such embodiments, rather than repeating the operations illustrated at 820 for each slice in series, they may be performed substantially concurrently for some or all of the vertical slices.

As illustrated in FIG. 8, once the processing of an image frame is complete (as in 850), if more image data is received, i.e., if there are more images in the sequence (shown as the positive exit from 860), the method may include repeating the operations illustrated at 810-850 to process data for additional image frames. This is illustrated in FIG. 8 as the feedback from 860 to 810. In other words, the method may include the hardware within the image signal processor stepping through the line buffers and slices thereof to perform various non-warping and/or warping transformations as the data is streamed in from the camera sensor, until no additional data is received (shown as the negative exit from 860), and the processing of the sequence of images is complete (as in 870).

Figure 9A:
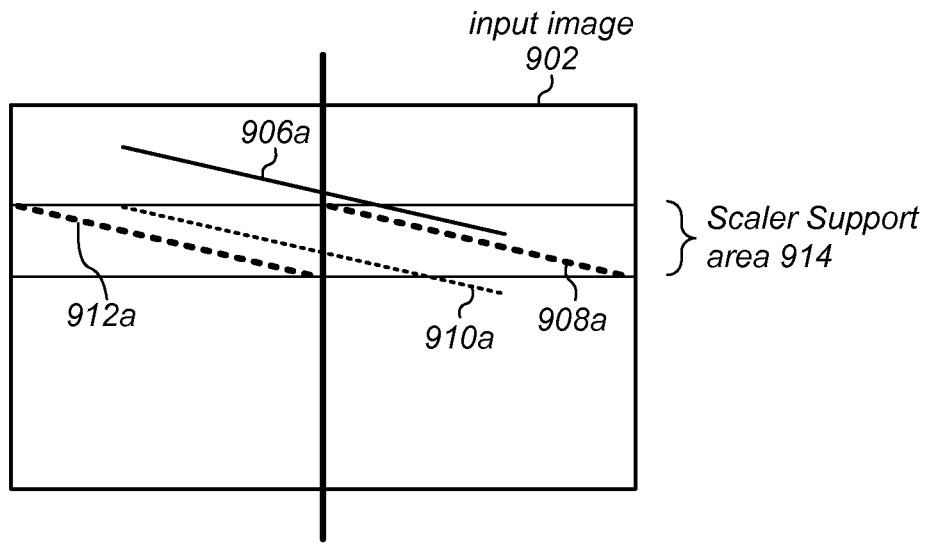
FIGS. 9A-9B illustrate the application of the techniques described herein for performing image stabilization, according to one embodiment.
Figure 9B:
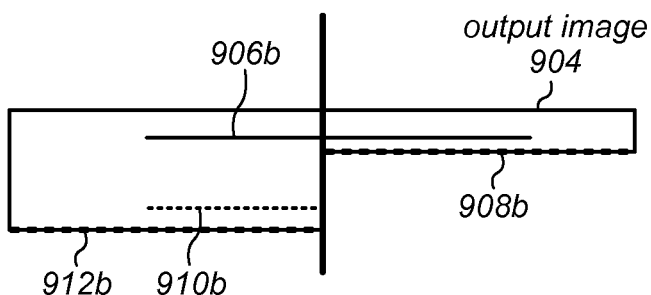

FIGS. 9A-9B illustrate the application of the techniques described herein for performing image stabilization, according to one embodiment. More specifically, these figures illustrate the operation of a striped output transformation unit (e.g., an output rescaling unit of an image signal processor that employs the striping techniques described herein). In this example, FIG. 9A illustrates an input image 902 that is to be rotated such that the diagonal lines 906*a* and 910*a* in input image 902 are horizontal in the output image 904 depicted in FIG. 9B. In this example, the area between the two thin horizontal lines labeled as scaler support 914 contains the lines of storage in the filter (i.e., its line buffers). The lower of these two lines represents the current line coming off the camera and the lines above it (within scaler support area 914) are the lines that are currently buffered. Note that neither of the diagonal lines 906*a* and 910*a* can fit in the support scaler area 914 since there is too much vertical displacement. The dashed lines 908*a* and 912*a* represent the trajectories of the output in the two vertical stripes, respectively. These become the horizontal lines 908*b* and 912B in the output buffer in FIG. 9B.

Note that the diagonal line 906*a*, which was too steep to be processed in a single strip can be walked when the buffers are processes as two separate strips (as divided by the thick, vertical line in FIGS. 9A and 9B). In this example, by processing the portion of diagonal line 906*a* in the right vertical stripe separately from the portion of diagonal line 906*a* in the left vertical stripe, diagonal line 906*a* is rotated to become horizontal line 906*b* in FIG. 9B. Similarly, the portion of diagonal line 910*a* in the right vertical stripe is processed separately from the portion of diagonal line 910*a* in the left vertical stripe, Note that each vertical stripe runs at a different rate, and that at the point in time illustrated in FIG. 9B, the portion of diagonal line 910*a* that is included in the left vertical stripe has been rotated to become horizontal line 910*b* (which includes only the left portion of the rotated line), while the portion of diagonal line 910*a* that is included in the vertical stripe on the right half of image 902 has not yet been processed and output to image 904.

In some embodiments, the techniques described herein for implementing image stabilization using piecewise transformations performed by an image signal processor (or an output recalling unit thereof) may allow a camera-like device to save half of the bandwidth and power typically required for image stabilization (e.g., using the GPU or CPU methods described above), may result in stabilized images of better quality than those produced using existing methods, and may leverage an existing hardware block (the ISP output rescaling unit) almost unchanged, with only a minor increase in the amount of line buffer storage required.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
 a camera sensor;
 an image signal processor; and
 a system memory;
 wherein the image signal processor is configured to:
  receive data representing an image from the camera sensor;
  divide the received image data into a pre-determined number of horizontal lines of pixels and a plurality of vertical stripes of pixels each comprising a pre-determined portion of the horizontal lines of pixels;
  determine motion in a sequence of images that includes the image represented by the received data;
  perform one or more non-warping image transformations and one or more warping image transformations on the received data to produce modified image data, wherein the warping image transformations are dependent on the determined motion;
  wherein to perform the one or more non-warping image transformations and the one or more warping image transformations, the image signal process is further configured to: apply at least some of the non-warping image transformations or the warping image transformations in a piecewise manner to the horizontal lines of pixels or the vertical stripes of pixels; and subsequent to performing the non-warping and warping image transformations, provide the modified image data to the system memory.

2. The apparatus of claim 1, wherein the one or more warping image transformations comprise one or more of a rotation, a shear transformation, or a perspective transformation.

3. The apparatus of claim 1, wherein the one or more non-warping image transformations comprise one or more of a translation or a scaling transformation.

4. The apparatus of claim 1, wherein the image signal processor is configured to perform the non-warping image transformations and the warping image transformations as a single image transformation operation.

5. The apparatus of claim 1, further comprising a video encoder configured to access the modified image data in the system memory or a display unit configured to access the modified image data in the system memory.

6. A method, comprising:
receiving, by an image signal processor, image data representing a frame of a sequence of images from an image sensor, wherein the image data is received as a stream of pixels, in raster order, from the image sensor;
performing, by the image signal processor, one or more non-warping image transformations and one or more warping image transformations on the received data to produce modified image data for the frame, wherein said performing comprises:
gathering pixels of the stream of pixels into a plurality of line buffers, wherein each line buffer includes pixels corresponding to a line of pixels in the frame;
processing the pixels in two or more pre-determined portions of the plurality of line buffers separately to perform a piecewise warping transformation of the received data, wherein each of the pre-determined portions of the plurality of line buffers comprises pixels in a respective vertical stripe of the frame; and
subsequent to performing the non-warping and warping image transformations, writing, by the image signal processor, the modified image data to a system memory, wherein said writing comprises providing output data representing the frame as modified by the piecewise warping transformation to the system memory.

7. The method of claim 6, further comprising, prior to said performing, the image signal processor determining motion in the sequence of images, wherein the warping image transformations are dependent on the determined motion.

8. The method of claim 6, wherein the one or more warping image transformations comprise one or more of a rotation, shear transformation, or a perspective transformation.

9. A system, comprising:
a device configured to perform image processing, the device comprising:
a camera interface configured to receive image data from an image sensor; and
an image processing pipeline configured to:
perform one or more non-warping transformations on the received image data;
perform one or more warping transformations on the received image data; and
provide output image data representing the received image data as transformed by the non-warping and warping transformations to a memory controller interface subsequent to performing both the non-warping and warping transformations; and
an output rescaling unit configured to perform the one or more warping transformations and at least one of the non-warping transformations; and
wherein the at least one non-warping transformation comprises a translation transformation or a scaling transformation.

10. The system of claim 9,
wherein the device is an image signal processor; and
wherein the system further comprises:
a camera coupled to the camera interface; and
a system memory coupled to the memory controller interface.

11. The system of claim 9, wherein to receive image data, the camera interface is configured to receive image data representing a frame of a sequence of images from an image sensor of a video recording device; and wherein the one or more warping transformations comprise an image stabilization transformation.

12. The system of claim 9, wherein to perform the non-warping and warping transformations, the device is configured to:
divide the received image data into a pre-determined number of lines of pixels, wherein each line of pixels corresponds to a line of pixels in an input image;
divide the lines of pixels into two or more vertical slices, wherein each vertical slice comprises the pixels in a same portion of each line of pixels; and
wherein to the transformation to the received image in a piecewise manner, the device if further configured to apply the transformations to the received image in a piecewise manner to the two or more vertical slices in parallel.

13. A method, comprising:
receiving, by an image signal processor, data representing an image;
dividing the received image data into a pre-determined number of horizontal lines of pixels and a plurality of vertical stripes of pixels each comprising a pre-determined portion of the horizontal lines of pixels;
determining, by the image signal processor, motion in a sequence of images that includes the image represented by the received data;
performing, by the image signal processor, one or more non-warping image transformations and one or more warping image transformations on the received data to produce modified image data, wherein the warping transformations are dependent on the determined motion;
wherein said performing comprises applying at least some of the non-warping image transformations or the warping image transformations in a piecewise manner to the horizontal lines of pixels or the vertical stripes of pixels; and
subsequent to performing the non-warping and warping image transformations, writing, by the image signal processor, the modified image data to a system memory.

14. The method of claim 13, wherein the received data represents a frame of the sequence of images, and wherein the sequence of images is received as a stream of pixel data from an image sensor.

15. The method of claim 13, wherein said determining motion comprises determining motion vectors dependent on a comparison of frames in the sequence or dependent on motion data received from a gyroscope.

16. The method of claim 13 wherein the one or more warping image transformations comprises a rotation, a shear transformation, or a perspective transformation.

17. A method, comprising:
- receiving, by an image signal processor, data representing an image, wherein the data is received as a stream of pixels, in raster order, from a camera interface;
- gathering, by the image signal processor, pixels of the stream of pixels into a plurality of line buffers, wherein each line buffer comprises a line of pixels that corresponds to a line of pixels in the image;
- processing, by the image signal processor, the pixels in two or more pre-determined portions of the plurality of line buffers separately to perform a piecewise warping transformation of the received data, wherein each of the pre-determined portions of the plurality of line buffers comprises pixels in a respective vertical stripe of the image; and
- providing, by the image signal processor, output data representing the image as modified by the piecewise warping transformation to a system memory.

18. The method of claim 17,
- wherein the method further comprises the image signal processor performing a non-warping transformation of the received data; and
- wherein said providing is performed subsequent to performing both the warping transformation and the non-warping transformation.

19. The method of claim 18, wherein the warping transformation and the non-warping transformation are performed by the image signal processor as a single image transformation operation.

20. The method of claim 17,
- wherein the method further comprises the image signal processor determining motion in a sequence of images that includes the image represented by the received data; and
- wherein the warping transformation is dependent on the determined motion.

21. The method of claim 17, further comprising a display controller accessing the output data in the system memory for display of the modified image.

* * * * *